July 11, 1961 L. E. JONES 2,992,127
NOVEL GRAPHITE ARTICLES AND METHOD OF MAKING
Filed Dec. 23, 1958
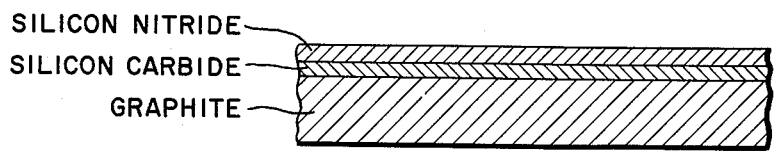
INVENTOR
Lloyd E. Jones
BY
*Stevens, Davis, Miller & Mosher*
ATTORNEYS

United States Patent Office 2,992,127
Patented July 11, 1961

2,992,127
NOVEL GRAPHITE ARTICLES AND METHOD OF MAKING
Lloyd E. Jones, Dallas, Tex., assignor to Texas Instruments Incorporated, Dallas, Tex., a corporation of Delaware
Filed Dec. 23, 1958, Ser. No. 782,402
3 Claims. (Cl. 117—21)

The present invention relates to a method for producing hard, abrasion-resistant and oxidation-resistant graphite or carbon articles. Further, the present invention relates to a method for producing graphite and carbon articles which are capable of use with molten silicon. The present invention also relates to articles produced in accordance with the principles of the present invention.

An embodiment of the articles of this invention is shown in the annexed drawing.

The virtues of using graphite and carbon articles for high temperature operations is well appreciated in the art. These materials possess desirable properties which enable them to be suitable for operations at extremely high temperatures, in the range of 1600° C. to 1800° C. Unfortunately, graphite and carbon are greatly susceptible to oxidation and abrasion and hence their use in an oxygen atmosphere or under abrasion conditions is impractical in view of an exceedingly short lifetime. Thus, although these materials have desirable high temperature characteristics, their use is seriously restricted by the above.

Accordingly, it is the principal object of the present invention to provide a novel and improved graphite or carbon article or part having practical abrasion and oxidation resistance whereby its use at high temperatures as a crucible, nozzle for a jet engine, liner, shield or plate or other device will be economically feasible. This is accomplished by means of the present invention by treating the surface of the graphite or carbon part to render it hard, abrasion and oxidation resistant. By means of the present invention, it is possible to prolong the lifetime of a graphite or carbon part many fold times that which it would have in the absence of the means described.

In addition to the above, it is desired to utilize graphite or carbon articles in conjunction with the production of silicon articles. The desirability of employing graphite crucibles or molds for casting and insulating devices, such as heat shields, is well recognized. Unfortunately, in some instances the graphite or carbon of the article will react with the materials being processed. This is especially true in the case of silicon. Molten silicon will react with graphite or carbon forming silicon carbide which is deleterious to the process. It would be desirable to have a graphite article which could be used with molten silicon without substantial interaction.

This is accomplished by means of the present invention by treating the surface of a graphite or carbon part to render it substantially non-reactive with molten silicon or silicon near its melting point.

Other objects and advantages of the present invention will become readily apparent from the following detailed description showing the best mode for carrying out the present invention.

The process for producing a graphite or carbon article which is hard, abrasion and oxidation resistant, will now be described. A graphite or carbon article, which has been previously machined or otherwise formed to the desired shape and configuration, is coated over its entire surface with a slurry of powdered silicon. The slurry is prepared by suspending finely powdered silicon, for example particles which pass a 150 mesh sieve (National Bureau of Standards) in a suitable vehicle such as alcohol. It will be appreciated that any other suitable vehicle or carrier may be employed so long as it is inert to both the graphite and the powdered silicon. The proportions of the slurry may vary within wide limits since it is only important that it be brushable so that a quantity of powdered silicon can be deposited upon every unit of surface of the graphite or silicon part using a brush.

The slurry of powdered silicon in alcohol is brushed upon the surface of the graphite part covering same. The method selected is unimportant so long as the result is accomplished. The result desired, of course, is to spread the slurry on the graphite part covering the entire surface.

After the graphite part has been coated with the slurry, it is heated in a suitable furnace to a temperature of from about 1360° C. to about 1420° C., for example, to about 1380° C. to cause the silicon to combine with the graphite and react with the surface of the graphite part. It will be appreciated that the alcohol is burned off before firing the part, since the temperature of firing is grossly in excess of the temperature required to vaporize the alcohol. Thus, there is no residue of alcohol or any other ingredient on the graphite or carbon part and consequently there remains a pure powdered silicon to combine with the surface of the graphite part. The heating of the graphite part is conducted in an inert atmosphere substantially at atmospheric pressure and any gas which is inert to the various ingredients of the process may be employed for this purpose. As a specific example of an inert atmosphere consider helium or argon.

The graphite or carbon part treated in accordance with the above is suitable for operation at extremely high temperatures in the range of from about 1600° C. to about 1800° C. The novel graphite part has also been found to possess good thermal shock characteristics. The article, when so produced, consists of the graphite part having a hard, abrasion and oxidation resistant surface or coating over its entire surface. In this form, the graphite part is suitable for use at high temperatures as a crucible, a nozzle for a jet engine, a high temperature liner, shield or plate, and for many other uses which will appear evident.

In a further refinement of the present invention, the graphite or carbon part which has been first treated as above described to form on the surface thereof a silicon carbide coating, may then be further treated by coating the surface with powdered silicon nitride. One convenient way to accomplish this is to take pure very finely powdered silicon nitride, for example particles which pass a 300 mesh sieve (National Bureau of Standards), and merely to rub it into the surface of the silicon carbide coated graphite article. This produces a further protective coating which has the unusual and desirable characteristic of rendering the graphite part substantially non-reactive to molten silicon or silicon near the melting point.

Articles which have been coated by this process have been found to be substantially inert to molten silicon and resist wetting and thus, are thereby capable of being used in a process in which molten silicon is present. As a specific example, the process of the present invention is capable of producing a mold part of graphite coated with silicon carbide and an outer coating of silicon nitride which can be used in the growing of silicon crystals.

The above constitutes a specific description of the present invention. It will be appreciated that various changes and modifications may be made which do not depart from the inventive concepts. Such changes and modifications as would occur to those skilled in the art from a knowledge of the teachings of the present invention, which do not in truth and fact depart from the inventive concepts of the present invention, are deemed to fall within the purview thereof.

What is claimed is:

1. A process for treating a graphite part which comprises coating a graphite part with powdered silicon and heating to a temperature of from about 1360° C. to about 1420° C. in an inert atmosphere and thereafter coating the graphite part with silicon nitride.

2. The process of preparing a graphite part which comprises forming a coating of silicon carbide on the surface of a graphite part and thereafter coating the surface of the graphite part with silicon nitride.

3. An article comprising a graphite part having a surface coating of silicon carbide and a further surface coating thereover of silicon nitride.

References Cited in the file of this patent

UNITED STATES PATENTS

| | | |
|---|---|---|
| 448,915 | Erlwein | Mar. 24, 1891 |
| 876,332 | Clark | Jan. 14, 1908 |
| 981,513 | Allen | Jan. 10, 1911 |
| 2,431,326 | Heyroth | Nov. 25, 1947 |
| 2,614,947 | Heyroth | Oct. 21, 1952 |
| 2,677,627 | Montgomery et al. | May 4, 1954 |
| 2,691,605 | Hediger | Oct. 12, 1954 |
| 2,707,157 | Stanton et al. | Apr. 26, 1955 |
| 2,859,139 | Ramadanoff | Nov. 4, 1958 |